INVENTOR.
HERBERT W. HEADLE
BY Wade Koontz and Martin J. Finnegan
ATTORNEYS

INVENTOR.
HERBERT W. HEADLE
BY Wade Koontz
Martin P. Hinnegan
ATTORNEYS

United States Patent Office 3,263,225 Patented July 26, 1966

3,263,225

MATRIX DISPLAY HAVING A DELAY LINE FOR SEQUENTIAL ENERGIZATION OF THE MATRIX INPUT LINES

Herbert W. Headle, Rome, N.Y., assignor to the United States of America as represented by the Secretary of the Air Force Filed Dec. 18, 1961, Ser. No. 160,375
2 Claims. (Cl. 340—324)

The invention described herein may be manufactured and used by or for the United States Government for governmental purposes without payment to me of any royalty thereon.

This invention relates to transmission of intelligence by radiant energy, and more particularly to the scanning of systems for displaying such intelligence.

Prior art scanning devices requiring more than one pulse and one input per sweep involve large amounts of complicated electronics and wiring, said amounts increasing more so when interlace is desired. Also, the prior art use of active elements in the sweep circuitry is not inherently stable and requires adjustment.

Accordingly, an object of this invention is to provide a new method and means for scanning automatically an electrical display matrix.

Another object of this invention is to provide a sweep of a matrix type display using only a single input and a single pulse.

A further object of this invention is to provide a multi-dimensional display matrix through the use of a single input for each dimension.

A still further object of this invention is to provide an inherent stability of display matrix sweep through the use of passive elements.

Still another object of this invention is to provide a simplification of electronic circuits for a display matrix through the use of only a single pulse per sweep.

Accordingly, by this invention, an electrical display matrix can be scanned automatically by using a single input of intelligence representing signals for each dimension. The novel device disclosed herein consists of a delay line that has equal spaced taps. Each tap feeds one line of the matrix and includes two resistors, a first resistor controlling the amplitude of the input signal, and a second resistor matching the line to prevent reflections. A source of pulse energy having a repetition time equal to or greater than a total time of the delay line is connected to one end of the line. Each pulse produced by this source appears on each tap successively. The pulses that appear on the taps may be modulated to allow display of the modulating information.

These and other features of the invention will be understood more clearly from the following detailed description and the accompanying drawings wherein.

Figure 1:
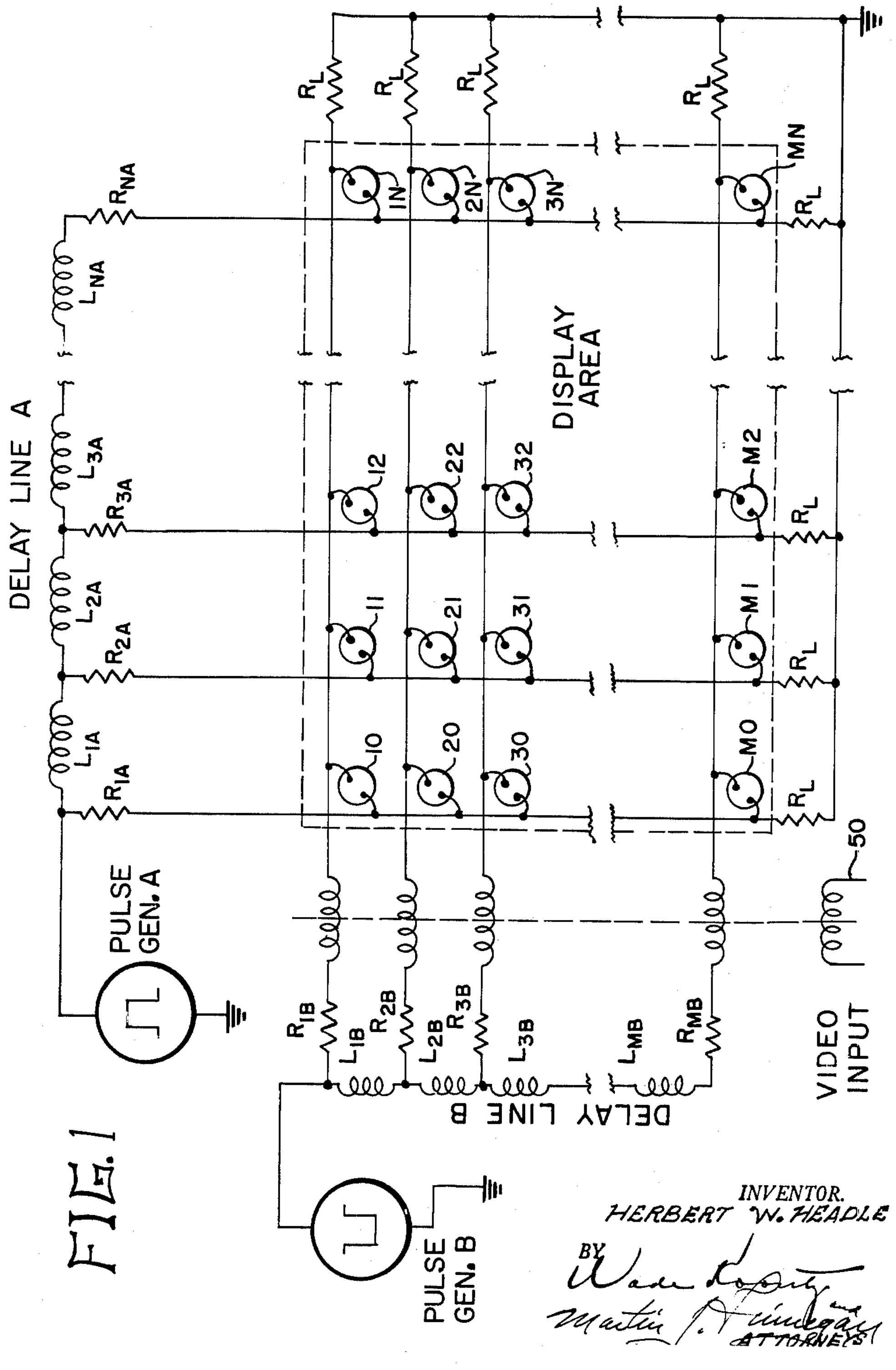
FIGURE 1 is a schematic diagram of an embodiment of the invention in a display panel of crossed conductors.

Referring now to FIGURE 1, the operation of this scanning device may be best understood in terms of a display panel known in the art; for example, a panel of cross conductors that will glow when a voltage appears between the crossed conductors. Assume a short pulse of plus polarity from pulse generator A travels down delay line A comprising a plurality of inductances $L_{1A}$, $L_{2A}$, $L_{3A}$ . . . $L_{NA}$. The length of the pulse must be less than the delay between $R_{1A}$ and $R_{2A}$, between $R_{2A}$ and $R_{3A}$, etc. At the same time a pulse of minus polarity from pulse generator B starts down delay line B comprising a plurality of inductances, $L_{1B}$, $L_{2B}$, $L_{3B}$ . . . $L_{MB}$. The length of this pulse must be less than the delay between $R_{1B}$ and $R_{2B}$ but should be about as long as the total delay time of delay line A. The amplitude of each pulse is approximately one-half the voltage required to light each lamp plus the loss due to resistors $R_{1A}$, $R_{2A}$, $R_{3A}$ . . . $R_{NA}$ and $R_{1B}$, $R_{2B}$ $R_{3B}$ . . . $R_{MB}$. With this arrangement, the neon lamps 10, 11, 12 . . . 1N, in the top row will light in sequence starting from lamp 10. By the time the last lamp on this row goes out, the pulse on delay line B appears on the second tap. The lamps 20, 21, 22 . . . 2N of this row would then light in sequence until all lamps have been pulsed, etc. In this manner, a raster similar to a television raster is produced.

It is to be noted that at the same time the sweep is occurring, video information 50 is modulating the pulse amplitude of all the horizontal lines as indicated in FIGURE 1.

Figure 2:
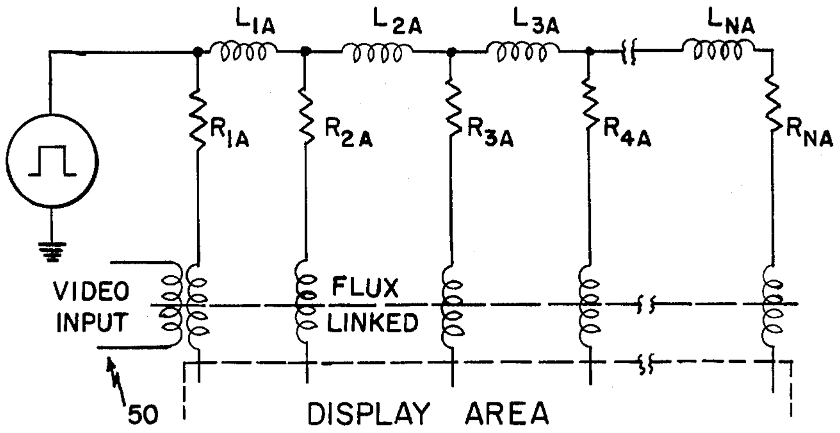
FIGURE 2 is a schematic of an alternative arrangement for displaying video information.

FIGURE 2 shows an alternative arrangement of video information 50 modulating the pulse amplitude of all the vertical lines. Only the lamp that has approximately the required voltage to light will be affected by the video information.

It also should be noted that the resistors marked $R_{1A}$, $R_{2A}$ . . . $R_{NA}$, $R_{1B}$, $R_{2B}$, . . . $R_{MB}$ are used to compensate for the loss of signal in the delay line, that is, $R_{1A}$ would be of higher resistance than $R_{2A}$ and $R_{2A}$ higher than $R_{3A}$; $R_{1B}$ would be of higher resistance than $R_{2B}$, etc. In this manner, each line of the matrix will have the same amplitude of signal. The resistors $R_L$ are used to match the line to prevent reflections. All of the taps are equally spaced for each of said delay lines.

Figure 3:
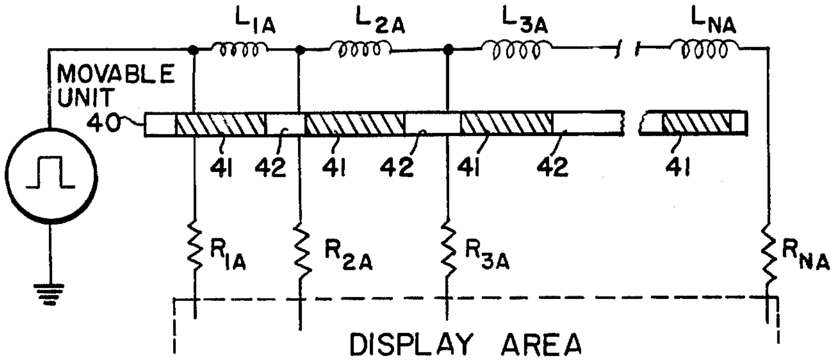
FIGURE 3 is a schematic of means for affecting a small adjustment in the delay lines.

As shown in FIGURE 3, the use of a movable unit 40 comprising a plurality of iron slugs 41 with voids 42 therebetween can effect a small adjustment in the delay line so that each small delay is affected by the same amount. Unit 40 is interposed between the plurality of inductors $L_{1A}$, $L_{2A}$ . . . $L_{NA}$ and the first series of resistors $R_{1A}$, $R_{2A}$ . . . $R_{NA}$.

While I have described a two-dimensional electrical display matrix, it will be clear that a one-dimensional display can be obtained with one input. Alternatively, interlace could be used by employing two delay lines for the horizontal lines and connecting every other line to them.

It will be understood that the described embodiment is intended to be exemplary of the principles of my invention only and not a limitation thereto, and that various modifications may be made within the scope of the following claims:

What is claimed is:

1. In an intelligence transmission system, scanning means including a display matrix having an input of pulse signals for one selected direction, said scanning means comprising pulse delaying means connected to said input, said delaying means consisting of a plurality of passive means connected in series, said delaying means having an effective length equal to or greater than the pulse repetition time of said input of intelligence representing signals, and means including a plurality of parallel conductive lines tapping said delaying means for establishing an informational pattern of signal displays having a predetermined relationship to the signal input achieved by said delaying means, said tapping means being equally spaced such that the pulse width of said input of said intelligence representing signals is less than the delaying time between said tapping means, said plurality of parallel conducting lines tapping said delaying means consisting of a first resistive means and a second resistive means connected in series, said parallel tapping means being arranged such that the first resistive means of the first plurality of first resistive means is higher in resistance value than the succeeding corresponding first resistive means, and the second plurality of second resistive means consists of second resistive means, all equal in resistance value.

2. Apparatus as described in claim 2 wherein delay adjsutment means are interposed between said delaying means and said tapping means to enable a variation in the effective length of said delaying means, said delay adjustment means affecting each of said plurality of passive delaying means by the same amount.

References Cited by the Examiner

UNITED STATES PATENTS

| | | | |
|---|---|---|---|
| 2,686,299 | 8/1954 | Eckert | 340—167 |
| 2,918,608 | 12/1959 | Rieth | 340—336 X |
| 2,989,732 | 6/1961 | Young | 340—167 |
| 3,015,747 | 1/1962 | Rosenberg | 315—169 X |
| 3,048,824 | 8/1962 | Thompson | 340—167 |

NEIL C. READ, *Primary Examiner.*

H. PITTS, *Assistant Examiner.*